Nov. 28, 1933.   L. B. EATON   1,937,011
ACOUSTICAL PLASTER
Filed Dec. 2, 1931
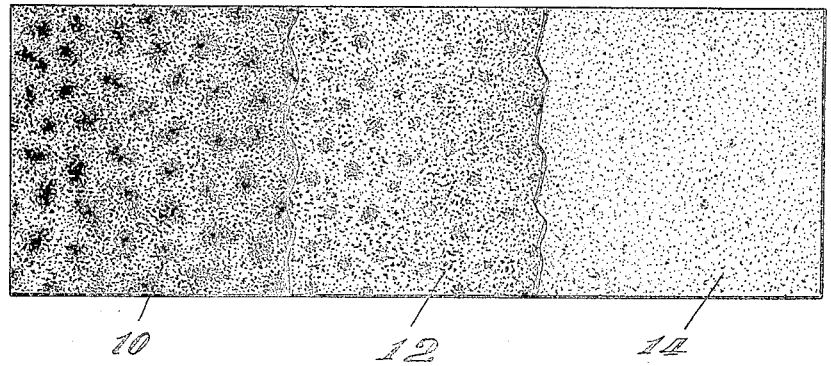
INVENTOR
Leslie B. Eaton
BY
Hammond & Littell
ATTORNEYS Patented Nov. 28, 1933

1,937,011

UNITED STATES PATENT OFFICE 1,937,011

ACOUSTICAL PLASTER

Leslie B. Eaton, Los Angeles, Calif., assignor to Kalite Company, Limited, Pasadena, Calif., a corporation of California Application December 2, 1931. Serial No. 578,615

7 Claims. (Cl. 72—17)

This invention relates to improvements in acoustical plasters and it particularly relates to a plaster having high sound absorbing properties to be used as an exterior finish coat for acoustical plaster for wall coverings and similar purposes. It is in part a continuation of my co-pending applications Serial No. 479,929, filed September 5, 1930, and Serial No. 517,147, filed February 20, 1931.

I have produced as described in my said previous applications an acoustical plaster having interconnecting pores which are not merely in the surface film but extend throughout the thickness of the plaster and provide a plaster having a higher sound absorbing efficiency than any acoustical plaster heretofore known, and one which becomes more sound absorptive as its thickness is increased.

In the present invention I have now discovered that it is possible to produce a thin coating of acoustical plaster which is also porous and has an improved acoustical effect and higher absorptive coefficient of sound absorption, but at the same time is of sufficiently fine texture to produce a substantially smooth outer surface, whereas the normal acoustical plaster has an uneven and pitted surface.

I have produced a fine textured surface coating of acoustical plaster which is formed of aggregate which may be ground from minus 20 to plus 60 mesh or finer and when mixed with a cementitious binder, a gelatinous product, and water, will have a high coefficient of sound absorption even though trowelled to a smooth hard finish, and which will not block up the pores in an under coat of acoustical plaster.

I have also discovered that it is possible to provide a surface coat of fine aggregate which may be completely troweled without materially effecting the sound absorptive quality of the plaster and may thus be applied to any acoustical product without noticeably impairing the sound absorptive quality thereof although it is preferably applied to undercoat plaster as made by my prior processes.

I have therefore produced a sound absorptive acoustical plaster having an intercommunicating porous body preferably produced in accordance with my prior processes and with a fine textured exterior coating which has a high coefficient of sound absorption and which may be more effectively finished off to give a smooth surface and which is more desirable in some respects for walls and ceilings and other places where the smooth surface is required.

Other features and advantages of my new plaster will appear from the following description thereof which describes a preferred form of mixture which has proved to be highly effective in use.

The drawing is a plan view partly in section of acoustical plaster showing the relatively finer aggregate of the surface coat.

This plaster because of its satisfactory smooth surface may preferably be used as a finish coat and has as its base a light porous material such as pumice which is normally found in the volcanic California deposits. Other light porous mineral products such as coke breeze or other similar cellular aggregates may be used. This aggregate may be ground to a fineness of from a minus 20 mesh to a plus 60 mesh or finer, and passed through suitable screens to classify it, and is then mixed with ordinary gypsum stucco plaster as a binder. A preferred proportion is three parts of pumice or light mineral aggregate to one part of gypsum by weight.

The liquid mix is preferably made separate and consists of a solution of twelve ounces of hide glue per gallon of water, to which is added six ounces of potash alum to facilitate hardening. Such a solution is diluted with ten to twelve gallons of water which is usually found to be sufficient for about two hundred pounds of dry materials, which would thus consist of approximately one hundred and thirty pounds of aggregate and seventy pounds of gypsum plaster. Such a proportion varies slightly and depends somewhat upon the surface to be covered, but is approximately the proper amount.

The dry materials and the liquid solution are mixed at the job as desired in the customary manner, and although the above separation of the wet and dry elements is preferable, it is also possible to mix the glue with the other dry materials and only add water. This has the advantage that the wet mix need not be transported.

As the pumice is naturally light and porous the mechanical mixing of the plaster forms air bubbles which are entrapped by the glue, and when applied the mass is substantially full of bubbles of air.

The plaster is applied with a hawk and trowel in the usual manner of applying plaster and requires no special equipment or skilled labor. In a preferred form the plaster is applied in three coats indicated as the first coat 10, second coat 12, and third or finish coat 14. It may be safely troweled to a smooth finish without reducing its porosity. When dry it is found that the air bubbles entrapped by the glue have burst due to the contraction and disintegration of the glue walls and a substantially open cellular structure with substantially 100% of interconnecting pores is formed. Such interconnection of the pores gives a high absorptive quality to the plaster which greatly exceeds the sound absorbing qualities of the prior known materials.

The finish coat 14 can be smoothly troweled to an apparently smooth, hard, and dense surface, which, however, does not destroy the acoustic properties of the plaster. Due to the proper intermixture of the light aggregate and the glue, it is found, that when dry, the finish coat has a myriad of extremely fine pores extending entirely through the finish coat and communicating with the larger pores of the coarser under coat. This is observable through a magnifying glass and apparently indicates that the entrapped air bubbles present when the surface is troweled are not troweled out but remain until the finish coat dries and the glue walls contract to form intercommunicating pores. Due to the exterior smoothness of the finish coat it is possible to apply non-bridging paints and lacquers or other wall finishes without interfering with or reducing the sound absorbing characteristics of the plaster.

This finish plaster may be applied to any base or under coat 12 although most effective acoustical properties will be found when applied to an under coat having an aggregate which is preferably ground to approximately minus 5 mesh to plus 30 mesh to which ordinary gypsum stucco plaster may be added as a binder. As described with the finish coat the preferable proportion is three parts of pumice or light aggregate to one part of gypsum by weight.

Similar substitutions may be made in the base coat as in the finish coat. Coke breeze, expanded slag, or other siliceous porous materials may be substituted for the pumice. Portland cement may be substituted for the gypsum plaster, although such substitute products may reduce the sound absorbing coefficient of the acoustical plaster to some extent. For the highest sound absorptive coefficient the plaster should be made of volcanic California pumice and gypsum plaster.

The under coat may be applied in two or three coats and if the acoustical plaster base is used it is preferably applied on metal lath or it may be applied to hard wall, plaster board, concrete, or other material. It will be found that if two under coats of acoustical plaster are used together with the finish coat heretofore described a very high coefficient of sound absorption will be obtained. It is to be understood, however, that the hard, porous finish coat may be applied to any surface with improved acoustical properties as the entrapped air bubbles are not troweled out even when the surface is troweled smooth and the smooth surface gives the appearance of an ordinary plaster wall.

It is my belief that the high sound absorbing efficiency of my acoustical plaster is due to its surface porosity and to the fact that the inner pores or cavities are substantially 100% intercommunicating from front to back of the plaster so that sound waves entering the surface pores are reverberated through the labyrinth of subsurface cavities until they are absorbed. Although a finer and more dense aggregate is used for the surface or finish coat, the glue walls which have previously entrapped air bubbles dry and disintegrate, thus forming completely intercommunicating pores throughout the material.

The plaster is plastic and can be easily applied to curved surfaces and run into molds, and as it is made without hair, felt, or fibre, and preferably has a mineral base, it is germ and vermin proof.

Inasmuch as the entrapping of the air is due to the mechanical mixing of the plaster and as there is nothing in the mix that will effervesce or spoil, an extreme rapidity of application is unnecessary. The plaster may preferably be handled in the usual manner of any gypsum plasters.

While I am aware that modifications may be made to the formula of the product set forth, it is to be understood that the product is a preferred one and that certain modifications may be made thereto within the scope and spirit of this invention, and I therefore desire a broad interpretation of this invention within the scope and spirit of the description thereof and of the claims appended hereinafter.

I claim:

1. An acoustical plastered surface having a plurality of coats in which the undercoat comprises a finely ground aggregate, a plaster binder, and an aqueous solution of a gelatinous material forming wall cells throughout the undercoat during the wet application of said undercoat and forming intercommunicating pores when the undercoat is dry, and a finish coat of similar materials, the aggregate being more finely ground than the aggregate in the undercoat, and the finish being troweled to a smooth surface.

2. An acoustical plaster having a finish coat, consisting primarily of aggregate ground from minus 20 mesh to plus 60 mesh or finer, a plaster binder and an aqueous solution of glue, said plaster having high sound absorptive qualities.

3. A finish coat for an acoustical plaster which comprises a mixture of a cementitious binder, a light porous aggregate ground to a fineness of minus 20 to plus 60 mesh, a gelatinous material to temporarily entrap air bubbles and alum, said surface being hard, porous and smooth.

4. An acoustical plastered surface consisting of a plurality of coats, the undercoat of which comprises a porous aggregate and a gypsum plaster binder in the approximate proportions of three parts of aggregate to one of plaster, and having temporarily entrapped air bubbles in the wet state which form interconnected pores in the dry state, and a final coat consisting of a relatively finer ground aggregate and binder, said final coat when trowelled to a hard, smooth surface having microscopic pores and high acoustical absorption.

5. An acoustical plaster finish coat applicable by ordinary hawk and trowel methods, comprising an aggregate, a binder, glue sufficient to act as an air binder during application of the mix, a hardening agent for the glue, and water, the aggregate being ground to a fineness of the order of minus 20 mesh, said coat when trowelled having a smooth surface, which, on drying, will have a hard microscopically porous sound absorptive structure from front to back thereof with intercommunicating pores.

6. An acoustical plaster surface applicable by hawk and trowel methods in a plurality of coats, each of said coats comprising an aggregate, a plaster binder, glue sufficient to act as an air binder during application of the respective coats, a hardening agent for the glue and water, the final coat having a relatively more finely ground aggregate than the under coats, each of said coats on drying having a cellular porous sound absorptive structure from front to back thereof with intercommunicating pores, said finish coat having a trowelled smooth hard and microscopically porous surface.

7. An acoustical plastered surface having a plurality of coats in which the undercoat and finish coat each comprise a finely ground aggregate, a plaster binder, an air binding and entrapping agent for temporarily entrapping air bubbles, and a hardening agent for the air entrapping agent, the aggregate in the finish coat being more finely ground than the aggregate in the undercoat, said finish coat, when trowelled to a smoth hard surface, rendering the surface sound absorptive with an acoustical absorption of at least 30% at 512 double vibrations.

LESLIE B. EATON.